United States Patent [19]

Davis et al.

[11] 3,925,282

[45] Dec. 9, 1975

[54] PRESSURE SENSITIVE HOT MELT ADHESIVES

[75] Inventors: Irwin Davis, Somerville; Martin M. Skoultchi, Somerset; John A. Fries, Piscataway, all of N.J.

[73] Assignee: National Starch and Chemical Corporation, Bridgewater, N.J.

[22] Filed: July 24, 1974

[21] Appl. No.: 491,270

[52] U.S. Cl. ........... 260/23 H; 260/23 R; 260/27 R; 260/27 EV; 260/86.1 N
[51] Int. Cl.² .................................. C08L 91/100
[58] Field of Search . 260/23 R, 23 H, 27 R, 27 EV, 260/86.1 N, 89.5 N

[56] References Cited
UNITED STATES PATENTS

| | | | |
|---|---|---|---|
| 2,837,491 | 6/1958 | McKay | 260/27 |
| 2,878,217 | 3/1959 | Jenkins | 260/27 EV |
| 3,198,760 | 8/1965 | Widenor | 260/27 |

FOREIGN PATENTS OR APPLICATIONS

| | | | |
|---|---|---|---|
| 857,507 | 12/1960 | United Kingdom | 260/27 |

Primary Examiner—Donald E. Czaja
Assistant Examiner—William E. Parker

[57] ABSTRACT

A pressure sensitive, hot melt adhesive composition is disclosed which possesses the reversible properties of strong cohesive strength at ambient temperatures and desirable melt viscosity at application temperatures and which is prepared by the reaction of a normally tacky acrylic-based random copolymer containing a tertiary amine-containing monomer with an organic metallic salt comprising a transition metal, tin or lead as the metallic component and an organic acid anion.

9 Claims, No Drawings

PRESSURE SENSITIVE HOT MELT ADHESIVES

BACKGROUND OF THE INVENTION

1. Field of the Invention

The invention relates to improved pressure sensitive hot melt adhesives. More specifically, it relates to novel hot melt adhesives having pressure sensitive properties which are comprised of a combination of acrylic-based copolymers containing a tertiary amine-containing comonomer and selected compatible organic metallic salts and which possess the reversible properties of strong cohesive strength at ambient temperatures and desirable melt viscosity at elevated application temperatures.

2. Brief Description of the Prior Art

For many years, pressure sensitive adhesive compositions have predominately been limited to water-based or organic solvent-based adhesives (i.e., pressure sensitive adhesive lacquers). These compositions exhibit excellent adhesive properties, as for example, bonding strength, tack and cohesive strength but, nevertheless, also possess several disadvantages. For example, the water-based adhesives tend to have poor water resistance, are subject to freezing, slow in drying and corrosive to some metals. The main disadvantages of the solvent based adhesives include fire and explosion hazards which necessitate the use of special ventilating and explosion proof equipment. In large scale uses of the solvent-based adhesives, the removal of organic solvent during drying may also contribute to significant problems of air pollution.

Hot melt adhesives are solid materials at room temperature. Application of heat melts the solid adhesive bringing it to the liquid or fluid state in which form it is applied to a substrate. On cooling, the adhesive regains its solid form. Hot melt adhesives are 100% solid materials and do not contain nor require any solvents. Mainly depending on the base polymer used and the optional ingredients, hot melt adhesives may be formulated to be relatively hard and free of tack or, in contrast, to be relatively soft and permanently tacky at room temperatures. This invention is concerned with those adhesives which are permanently tacky at room temperatures and which adhere on mere contact with adhesive-receptive surfaces to which they are applied, i.e., pressure sensitive hot melt adhesives.

In preparing a pressure sensitive hot melt adhesive, the desirable properties include a high cohesive strength at room temperature for good holding power aand low shrinkage of the adhesive film on flexible plastic substrate, together with a relatively fluid viscosity of the hot melt at commonly employed application temperatures of 250°–350°F. Moreover, there is a need that these properties be reversible over an extended period of time due to the operating conditions present during use thereof. Thus, the adhesive must be capable of retaining its desired melt viscosity even when held at the elevated application temperatures for a period of several hours. Additionally, because it is necessary to work with rather large quantities of molten adhesive at one time, it is desirable that the cross-links which form when the adhesive cools may be broken upon re-melting so that the adhesive remaining when a job is completed or at the end of the day may be reutilized.

Acrylic polymers and copolymers have found extensive use as the base polymer in pressure sensitive adhesive lacquers or water-based systems mainly because of their clarity, adhesion to non-primed surfaces, good aging characteristics, as well as their excellent properties of tack, peel and cohesive strength. Attempts to utilize acryllic polymers or copolymers in pressure sensitive hot melt adhesives have not proven successful in the past, however, because of difficulties associated with melt viscosity. In order to have a hot melt adhesive that is sufficiently fluid at application temperatures, either a very low molecular weight polymer must be used or a high molecular weight polymer must be extended with a high proportion of low molecular weight oils or resins (tackifiers) to reduce the melt viscosity. Both of the alternatives are undesirable since low molecular weight polymers will produce adhesives which lack cohesive strength, and the use of high molecular acrylic polymers necessitates the use of expensive additives which frequently distract from the cohesion, adhesion or tack of the resultant adhesive. In the past, it has often been necessary to compromise certain properties of these hot melts in order to obtain a workable adhesive having a very narrow range of utility. Attempts have been made to produce acrylic-based hot melt adhesives exhibiting pressure sensitive properties by incorporating in the copolymer system certain metal salts, mainly metal alkoxides. The thus produced adhesives have improved cohesive strength. However, in order to gain this strength, it has been necessary to use copolymers containing carboxyl reactive functionalities and the presence of these carboxyl groups can be detrimental to the adhesive system since it can result in the formation of permanent, irreversible cross-links, the disadvantages of which have been previously discussed.

There is thus need in the art for hot melt, pressure sensitive adhesive formulations which are reversible in that they exhibit good cohesive strength at ambient temperatures as well as desirable melt viscosity at the elevated application temperatures and in which the use of either low molecular weight acrylic polymers, carboxyl groups and/or large amounts of tackifiers in connection with high molecular weight acrylic copolymers is eliminated.

SUMMARY OF THE INVENTION

In accordance with the present invention, it has now been found that when acrylic monomers are polymerized with comonomers containing tertiary amine groups, the resultant random copolymers are capable of forming reversible coordinate cross-links on the addition of small amounts of selected organic metallic salts. Thus, on the addition of suitable metallic salts to selected acrylic copolymers, the properties of the resultant copolymers, particularly the cohesiveness of the solid copolymers, are significantly changed. At room temperatures, the solid hot melt adhesive contains significant cross-links so as to thereby exhibit improved strength (cohesive properties) as compared to the non-crosslinked copolymer. On the application of heat and the melting of the solid, these crosslinks are temporarily dissociated or broken, thereby yielding a copolymer with a desirable, relatively low melt viscosity which is stable over an extended period of time when held at these temperatures. However, when the copolymer is again cooled to about room temperature, the coordinate cross-links reform, thus imparting the desired strength to the bonded system. Moreover, the adhesive formulation of the present invention may be heated and cooled a number of times and still retain these characteristic properties at both room temperature and at elevated temperatures.

It is therefore an object of the present invention to provide a new class of pressure sensitive hot melt adhesives which possess the reversible properties of strong cohesive strength at ambient temperatures and desirable melt viscosity at elevated temperatures.

It is a further object of the invention to improve the cohesive properties of acrylic copolymers while maintaining a desirable melt viscosity by the addition thereto of selected organic metallic salts.

DESCRIPTION OF PREFERRED EMBODIMENTS

The hot melt adhesives of this invention have melt viscosities between about 400 and 200,000 cps., preferably from about 2,000 to 80,000 cps., at 350°F. The acrylic-based random copolymers which may be used include normally tacky copolymers of one or more acrylate ester monomers selected from the group consisting of the alkyl esters of acrylic and methacrylic acid wherein said alkyl groups contain 4 to about 12 carbon atoms. Such esters include n-butyl acrylate, n-pentyl acrylate, n-hexyl acrylate, n-heptyl acrylate, n-octyl acrylate, n-nonyl acrylate, n-decyl acrylate, n-undecyl acrylate, n-dodecyl acrylate; their correspondingly branches isomers, such as 2-ethylhexyl acrylate, etc. as well as the corresponding methacrylate esters. Optionally, the copolymer may be prepared with one or more polymerizable comonomers selected from the groups consisting of vinyl esters, vinyl ethers, vinyl halides, vinylidene halides, nitriles of ethylenically unsaturated mono- and dicarboxylic acids and their partial or full esters and ethylenically unsaturated hydrocarbons. Examples of these optional comonomers include vinyl acetate, vinyl ethyl ether, vinyl chloride, vinylidene chloride, acrylonitrile, maleic anhydride and styrene. The adhesive compositions may also comprise copolymers of acrylics and methacrylics with other polymerizable monomers such as the copolymers of butyl acrylate-vinyl acetate or 2-ethylhexylacrylate, vinyl acetate and acrylic acid.

The polymerizable amine-containing comonomers which together with the acrylic monomer and optional polymerizable comonomers form the random copolymers of the hot melt adhesives described herein are those having at least seven carbon atoms, preferably seven to twelve carbon atoms and containing tertiary amine groups. Typical preferred amine-containing comonomers include 2-vinyl pyridine, 4-vinyl pyridine, N-vinyl pyrrolidone, dimethylaminoethyl acrylate, dimethylaminoethyl methacrylate, diethylaminoethyl acrylate and diethylaminoethyl methacrylate.

The choice of the particular amine-containing component is dependent to a certain degree upon the strength required in the final product since it has been found that the aromatic amines form stronger complexes with the metal components than the corresponding aliphatic amines.

With regard to proportions of the monomers employed in the copolymer, the acrylic monomer will ordinarily constitute at least about 50% by weight of the total copolymer. The proportion of the amine-containing monomer in the copolymer will vary depending primarily upon the particular monomers and metallic salt employed and the structural properties required for a specific end use of the adhesive. In most cases, however, the amount is between about 0.5 and 15% by weight of the total copolymer with the remainder of the copolymer comprising the optional copolymerizable components. Preferred adhesives will ordinarily contain the amine comonomer in an amount from about 1 to about 8% by weight.

The copolymers employed herein may have a negligible or unmeasurably low standard Williams plasticity number before it is combined with the metallic salt. In some cases, it is preferred that the copolymer have negligible plasticity numbers before combination with the metal and at least about 1.0 after combination. Thus, an advantage of the method of the present invention is that it allows the use of essentially fluid, low cohesive materials or materials with no or low plasticity to be transformed into useful elastomeric adhesives of higher plasticity. The final plasticity of the adhesive is usually below about 3.5, although where the plasticity is above this level, some added tackifiers may be provided to produce the desired properties. Plasticity may be defined as the property of a polymeric material which enables it to be deformed permanently and continuously, without rupture, upon the application of a force thereto. This property is measured by the use of a William's Plastometer which is manufactured by Scott Testers, Inc. and is designed to conform to the standards set by ASTM Method D-926.

In determining Williams plasticity values, a film, having a dry thickness of 2 to 3 mils, of the polymer being evaluated, is cast onto a conventional release sheet. The dry film is peeled from the release sheet and molded into a solid cylindrical slug approximately 1 ½ cm. wide, 2 cm. long, and weighing exactly 1.8 gms. The slug is then conditioned for 15 minutes at a temperature of 38°C. whereupon it is inserted between the two parallel platens of the plastometer which have also been maintained at a temperature of 38°C. The upper platen, which is weighted with 5 kg. and is attached to a micrometer which serves to measure the height of the slug after compression, is lowered onto the slug and maintained in that position for 15 minutes. The resulting micrometer readings, in millimeters, indicate the resistance to plastic flow on the part of the polymer samples being evaluated. High plasticity values are indicative of greater resistance to flow, and thus, denote a firmer polymer whereas low plasticity values are indicative of less resistance to flow, and thus, denote a softer polymer.

As will be recognized by those skilled in the art, the preparation of the above-described copolymers can be carried out using well-known free radical initiated polymerization procedures. Thus, the acrylic-based random copolymers containing amine-containing comonomers may be produced by solution, emulsion or bulk polymerization procedures. If the polymerization is carried out in the presence of a solvent, the solvent can be stripped from the system before use as an adhesive. The copolymer composition may also comprise various other additives such as plasticizers, tackifiers, fillers, etc.

The metallic salts utilized in the above-described copolymers comprise organic salts of certain polyvalent metals. The useful metals include the transition metals as well as tin and lead. Mixtures of two or more of these metals may also be used to give the desired results. Examples of preferred transition metals include copper, cadmium, cobalt, nickel, zinc, iron, etc. The anionic portion of the metallic salt comprises an organic acid anion, preferably a fatty acid anion, with the choice of the particular acid dependent upon its solubility in the copolymer system. Specific organic acid anions which may be employed include the laurates, octoates, salicylates, acetates, caprylates, neo-deconates, etc. with a preferred anion being the resinate. The metallic salt or salts containing the organic acid anion may be added directly to the copolymer or the organic salt may be formed in situ as will be described below. Alternatively, the metallic salt may be added during the production of the copolymer and prior to removal of any solvent therefrom. Preferred metallic salts include zinc laurate, cupric laurate, zinc salicylate, cadmium octoate, chromium octoate, cobalt octoate, nickel octoate, zinc resinate, cobalt resinate, zinc caprylate, etc. A particularly preferred combination of salts comprises zinc resinate and cobalt octoate.

The choice of the particular metallic salt or salts is dependent upon a variety of factors, among which is the specific end use of the adhesion composition. Thus, we have found that certain metals form stronger coordinate bonds in the copolymer system with chromium forming the strongest bonds and nickel, cobalt, copper, zinc and cadmium forming progressively weaker bonds. Additionally, many of the metal ions described herein form colored complexes so in areas where color might be important, it may be desirable to use a zinc or cadmium salt which will result in the formation of a colorless complex.

Generally, the metallic salt or salts will be present in an amount of about 0.25 to about 25% by weight of the copolymer, preferably between about 1.0 and 15% by weight, although amounts up to 40% by weight may be used. The precise amount of metal employed will of course be dependent upon the particular metallic salt chosen as well as the degree of cohesion required in the particular end use since the different metals form bonds of varying strength as previously discussed.

The metallic salt or salts may be added at any time during preparation of the copolymers in the adhesive and in any conventional manner. Conveniently, the copolymer may be melted and the metallic salt added thereto. If the organic metallic salt is to be formed in situ, the oxide or hydroxide of the metal may be dispersed in the copolymer and then an acid component added to form the desired organic metallic salt in situ.

The unique adhesive compositions thus formed find application in a wide variety of products such as vinyl wall coverings, tapes, labels and decals as well as in such other applications wherein solution acrylics are presently employed. These compositions offer an advantage to the previously employed solution acrylics by eliminating the need for solvent removal after application of the adhesive, while providing a composition possessing superior cohesive and adhesive properties.

During use, the hot melt composition need only be heated to a temperature about 250°–400°F. to render the composition fluid and flowable and to allow the composition to remain flowable for the time required for application thereof.

If the adhesive composition is to be applied to a backing or substrate, this procedure may be accomplished using any conventional means such as roller coating, dip coating, extrusion, or spray coating. The backing onto which the hot melt composition is applied may be selected from a variety of materials, including textile fabric, plastic film, nonwoven fiber sheets, metal sheets or foil, rubber or synthetic rubber, decorative sheets, plywood, decals, etc. If the coated substrate is to be used in the form of a roll, the back of the tape is usually coated with a release backsize or abhesive coating. Double-sided coated adhesive articles may also be prepared and a strippable paper or other protective means inserted if the article is to be rolled. Additionally, substrates may be laminated onto the adhesive-coated backing in situ, i.e., the hot melt coating may be applied to the backing and the substrate placed over the adhesive. Alternatively, a pressure sensitive adhesive film may be formed by applying the hot melt to a release material such as silicone coated paper; thereafter when the adhesive is to be employed, it may then be stripped from the release material and used as a film.

The examples set forth below serve to illustrate the invention in certain of its embodiments in forming the improved pressure sensitive, hot melt adhesives. All parts and percentages in these examples as well as throughout the specification are by weight unless otherwise noted.

Example I

This example illustrates the preparation of an abhesive composition typical of the invention as well as the improved properties imparted to the adhesive compositions as a result of the presence of both the amine-containing comonomer and the organic metallic salt.

A low molecular weight copolymer having a Williams plasticity of 0.70 was prepared by solution polymerization comprising 86% by weight of 2-ethylhexyl acrylate, 10% of acrylonitrile and 4% of dimethylaminoethyl methacrylate. The copolymer was heated to about 350°F. during which time the polymer solvent was distilled off; and to 100 parts of the fluid copolymer was added 12 parts of Pexate 511. The latter product is a commercially available zinc resinate containing 11.3% zinc with a melting point of 293°F. sold by Hercules Company, Wilmington, Delaware. The resin was dissolved in the copolymer with agitation and thereafter a 1.5 mil film was cast on a polyester film base. The cooled copolymer with the zinc resinate showed a Williams plasticity of 1.25.

For comparison purposes, a similar copolymer was prepared omitted the dimethylaminoethyl methacrylate and increasing the concentration of 2-ethylhexylacrylate to 90%, by weight, and having a Williams plasticity of 0.93. When 12 parts of Pexate 511 was added to 100 parts of this fluid copolymer, the mixture showed a Williams plasticity of 0.97.

It is seen from the above that the addition of zinc resinate to the copolymer lacking the amine-containing monomer was substantially without any effect on the plasticity of the copolymer. In contrast, however, the addition of zinc resinate to the copolymer containing 4% by weight of dimethylaminoethyl methacrylate changed the plasticity from a Williams plasticity value of 0.70 to 1.25. As previously discussed, higher Williams plasticity values denote a firmer polymer with lower values denoting a softer polymer.

The comparative properties of the various adhesives were measured by test procedures described as follows:

180° Peel Adhesion Test — This test consists of measuring the force necessary to strip or delaminate the adhesive film test sample (1 inch × 6 inch × 1.5 mils) coated on 2 mil polyester film from a stainless steel panel at a rate of pull, or withdrawal, of 12 inches per minute. An Instron Tensile Tester was used to provide the pulling force. Thus, the force necessary to effect delamination is recorded as the "180° Peel Adhesion" value.

180° Hold Test — This test measures the internal strength of the adhesive. In conducting this test, films of the adhesive being evaluated are applied to a 2 mil Mylar (polyethylene terephthalate) backing in a 1.5 mil thickness. The test samples 1 × 3 inches) are securely adhered by thump pressure to the top of a ½ inch chrome-steel bar. The bar is in a position in which the film makes a 180° with the vertical. Thereafter, a 500 gram weight is secured to the sample and the time required for the film to separate or delaminate from the bar is recorded as the "180° Hold" value. A 180° hold value of at least 60 minutes for pressure sensitive hot melt adhesives is considered to be necessary for the adhesive to be commercially acceptable.

Using the above-described tests, the following results were obtained for the adhesives prepared in accordance with this example.

TABLE I

| Copolymer Composition | 180° Peel Adhesion Value | 180° Hold Value (min.) |
|---|---|---|
| 2-ethylhexylacrylate/acrylonitrile/dimethylaminoethylacrylate:zinc resinate | 58 oz./inch | 65 min. |
| 2-ethylhexylacrylate/acrylonitrile/dimethylaminoethyl acrylate | 56 oz./inch | 3 min. |
| 2-ethylhexylacrylate/acrylonitrile | 38 oz./inch | 3 min. |
| 2-ethylhexylacrylate/acrylonitrile:zinc resinate | 61 oz./inch | 4 min. |

Example II

The procedure of Example I was used to prepare an adhesive composition comprising 86% 2-ethylhexylacrylate, 10% acrylonitrile and 4% 4-vinylpyridine containing 10 gms. zinc resinate per 100 gms. polymer. The resulting composition had a Williams plasticity of 1.66, a 180° adhesion value of 72 oz. and a 180° Hold value of 255 minutes.

Example III

The procedure of Example I was used to incorporate a variety of metallic salts in the polymer used in Example II. The salts used and test results are shown in Table II.

TABLE II

| Organic Metal Salt | Parts Per Hundred | Williams Plasticity | 180° Adhesion | 180° Hold |
|---|---|---|---|---|
| Zinc Laurate | 3.0 | 1.12 | 35.0 oz. | 30 min. |
| Cupric Laurate | 3.0 | 1.37 | 45.0 | 125 |
| Zinc Salicylate | 3.0 | 1.20 | 50.0 | 90 |
| Cadmium Octoate | 3.5 | 1.00 | 56.0 | 23 |
| Chromium Octoate | 1.0 | 1.60 | 30.0 | 255 |
| Cobalt Octoate | 3.0 | 1.75 | 28.0 | 385 |
| Nickel Octoate | 2.0 | 1.66 | 25.0 | 310 |
| Zn Resinate Octoate Ratio (7:1.5) | 17 | 1.71 | 50.0 | 240 |
| None (Control) | — | 0.70 | 56.0 | 3 |

Example IV

This example illustrates the preparation of additional samples of adhesives containing varying polymeric systems as described in this invention. The procedure described in Example I, hereinabove, was repeated with a number of variations being made with respect to the monomers utilized as well as to their comonomer ratios. The following table describes all of the copolymers thus produced.

TABLE III

| Monomer | Polymer Compositions (Parts) | | | | | | | | | |
|---|---|---|---|---|---|---|---|---|---|---|
| | A | B | C | D | E | G | H | I | J | K |
| 2-Ethylhexyl Acrylate | 70 | 72 | 87 | 85 | 36 | 85 | 87 | 80 | — | — |
| Vinyl Acetate | 25 | 25 | 10 | 10 | — | — | — | — | — | — |
| Acrylonitrile | — | — | — | — | — | — | — | — | 7 | — |
| Methyl Methacrylate | — | — | — | — | — | 10 | — | — | — | — |
| Diacetone Acrylamide | — | — | — | — | — | — | 10 | — | — | — |
| Butyl Acrylate | — | — | — | — | 59 | — | — | — | 90 | 95 |
| 4-Vinyl Pyridine | — | 3 | 3 | — | — | 5 | 3 | — | 3 | — |
| Dimethylaminoethyl Methacrylate | 5 | — | — | 5 | 5 | — | — | 5 | — | 5 |
| Styrene | — | — | — | — | — | — | — | 15 | — | — |

In all cases, the resulting copolymers were found to have Williams plasticity values of 0.50 to 1.10 when polymerized in solution. The solvent was removed by heat and vacuum to produce a flowable copolymer which was melted with approximately 10 parts zinc resinate per 100 parts dry polymer to given an adhesive composition possessing substantial increases in plasticity and hold values.

Example V

This example illustrates the production of the metallic organic complex in situ by dispersion of the oxide of the metal into the polymer prior to addition of a high acid number rosin.

To 100 gms. of the polymer of Example 1, 6 gms. rosin was added and melted together, after which 10 gms. zinc oxide was added. Tests of the resulting polymer showed a plasticity of 1.20, a peel of 41.0 oz. and a hold value of 88 minutes.

The above procedure was repeated using the polymer of Example II. The results showed a plasticity of 1.34, a peel of 41.0 oz. and hold value of 111 minutes.

In summary, it may be seen that the addition of specific organic metallic salts to acrylic-based random copolymers containing tertiary amine-containing comonomers results in pressure sensitive hot melt adhesive compositions which contain crosslinks at ambient temperatures and thus exhibit strong cohesive strength and which crosslinks dissociate when the adhesive is heated to elevated temperatures so as to provide desirable melt viscosity during application.

We claim:

1. A pressure sensitive, hot melt adhesive composition which possesses the reversible properties of strong cohesive strength at ambient temperatures and desirable melt viscosity at application temperatures, said composition comprising an adhesive polymer formed by the reaction of:
   A. a normally tacky random copolymer consisting essentially of:
      1. at least about 50% by weight of at least one monomer chosen from the group consisting of the alkyl esters of acrylic and methacrylic acid wherein the alkyl groups contain 4 to about 12 carbon atoms, and
      2. 0.5 to 15% by weight of a tertiary amine-containing comonomer containing at least 7 carbon atoms; and
   B. 0.25 to 40% by weight of the copolymer of at least one organic metallic salt wherein the metal is chosen from the group consisting of the transition metals and tin and lead and the anionic component is an organic acid anion.

2. The adhesive composition of claim 1 wherein the copolymer of component A is prepared with one or more polymerizable comonomers.

3. The adhesive composition of claim 1 wherein the tertiary amine-containing comonomer is present in an amount of 1.0 to 8% by weight of the total copolymer.

4. The adhesive composition of claim 1 wherein the organic metallic salt is present in an amount of 1.0 to 15% by weight of the copolymer.

5. The adhesive composition of claim 1 wherein the anionic component of the organic metallic salt is a residue of a fatty acid.

6. The adhesive composition of claim 1 wherein the organic metallic salt is chosen from the group consisting of zinc laurate, cupric laurate, zinc salicylate, cadmium octoate, chromium octoate, cobalt octoate, nickel octoate, zinc resinate, cobalt resinate, zinc caprylate and mixtures thereof.

7. The method of forming pressure sensitive, hot melt adhesive compositions having the reversible properties of good cohesive strength at ambient temperatures and desirable melt viscosity at application temperatures, which method comprises reacting a normally tacky random copolymer consisting essentially of at least about 50% by weight of at least one monomer chosen from the group consisting of the alkyl esters of acrylic and methacrylic acid wherein the alkyl groups contain 4 to about 12 carbon atoms and 0.5 to 15% by weight of a tertiary amine-containing comonomer containing at least 7 carbon atoms with 0.25 to 40% by weight of the copolymer of at least one organic metallic salt wherein the metal is chosen from the group consisting of the transition metals and tin and lead and the anionic component is an organic acid anion.

8. The method of claim 7 wherein the previously formed copolymer is heated to 250°–400°F. and the organic metallic salt added thereto.

9. The method of claim 7 wherein the organic metallic salt is formed in situ by the reaction of the metal oxide or hydroxide with an acid component.

* * * * *